Nov. 16, 1965 F. E. STUTSMAN 3,217,356
APPARATUS FOR MOLDING FIBERGLASS BOAT HULLS
Filed Jan. 4, 1962 3 Sheets-Sheet 1
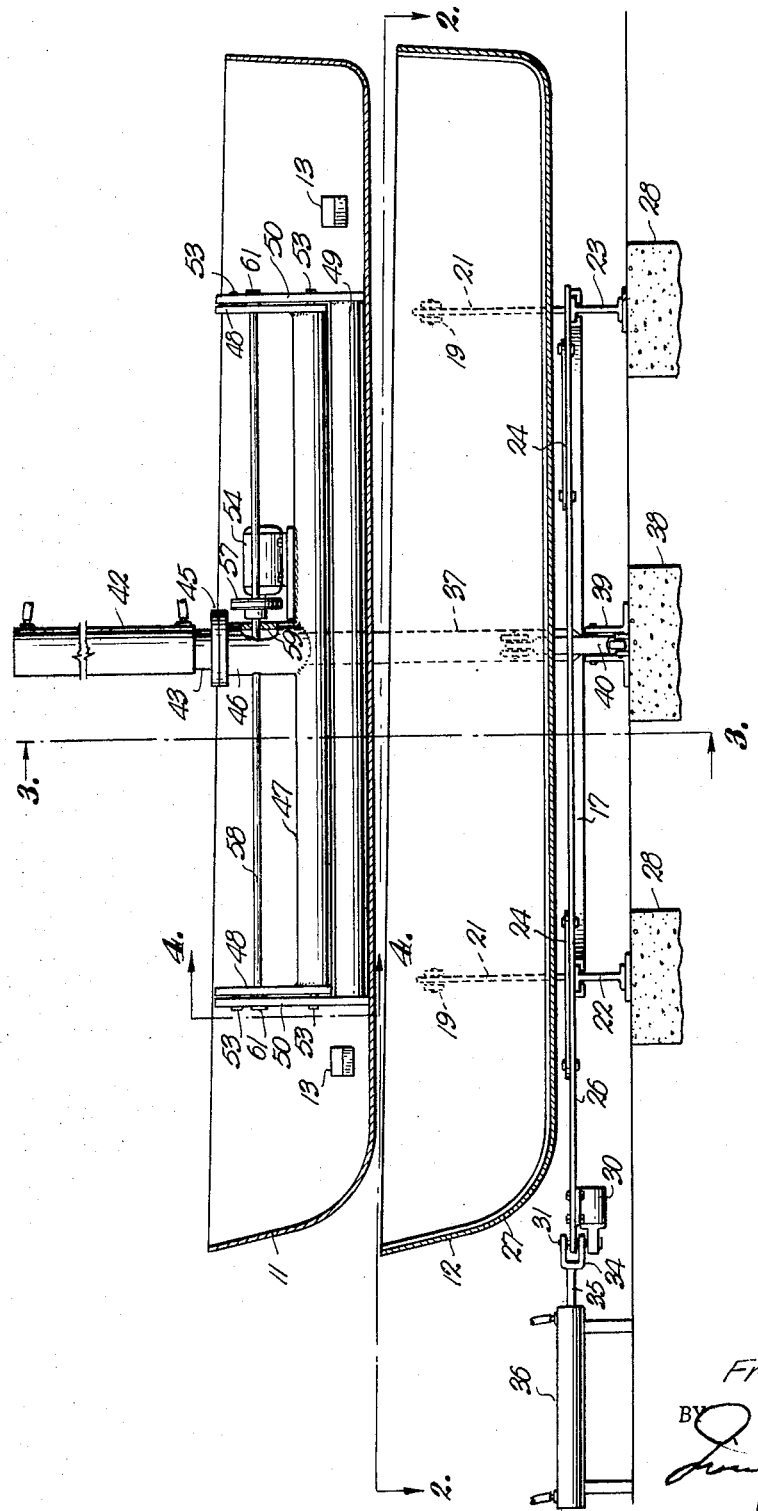
Fig. 1.
Fig. 6.
INVENTOR.
Fred E. Stutsman
BY
ATTORNEY.

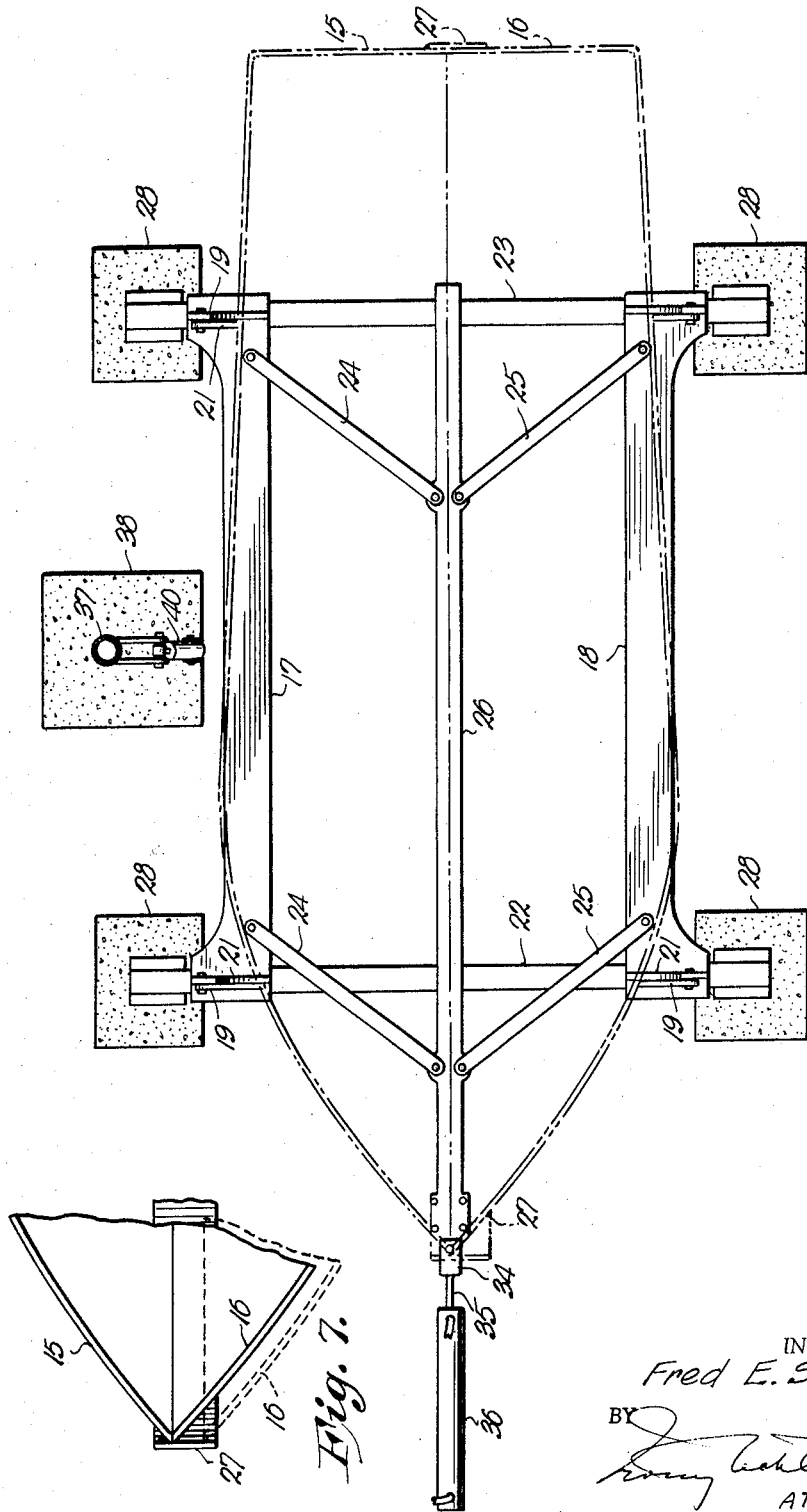

Nov. 16, 1965  F. E. STUTSMAN  3,217,356
APPARATUS FOR MOLDING FIBERGLASS BOAT HULLS
Filed Jan. 4, 1962  3 Sheets-Sheet 3

INVENTOR.
Fred E. Stutsman
BY
ATTORNEY.

United States Patent Office 3,217,356
Patented Nov. 16, 1965

3,217,356
APPARATUS FOR MOLDING FIBERGLASS BOAT HULLS
Fred E. Stutsman, Box 704, Waynesville, Mo.
Filed Jan. 4, 1962, Ser. No. 164,298
2 Claims. (Cl. 18—5)

This invention relates to improvements in molding apparatus and has particular reference to molding apparatus employed in the forming of reinforced Fiberglas plastic boat hulls. However, the apparatus may be also used for many different shapes of large molded objects, and also other compositions of materials may be employed.

In molding large objects of Fiberglas the problem exists of causing the plastic to flow throughout the length and width of the mold, and also to penetrate the several layers of Fiberglas. One object of this invention is to provide an apparatus for solving these problems.

A further object is to provide such apparatus which permits the molded object to be easily stripped or removed from the mold.

A further object of the invention is to provide an apparatus for molding large plastic or laminated objects which consists of providing a dual mold in which the female and male portions of the mold are so constructed that there may be a vibratory or oscillatory movement substantialy perpendicular to the face, or inner surface, of the mold and also an oscillatory or vibratory movement substantially parallel to the face of the mold.

These and other objects of this invention will become more apparent upon consideration of the following specification an drawings in which FIGURE 1 is a sectional elevational view of a mold embodying the invention.

FIGURE 2 is a horizontal section taken along the line 2—2 of FIGURE 1, showing the method of actuating the female mold.

FIGURE 6 is an enlarged detail drawing, partially in cross-section of the mechanism for opening and closing the female mold.

FIGURE 7 is an enlarged detail drawing of the mechanism by which the female mold is sealed when in open position.

As shown on the drawings:

Figure 3:
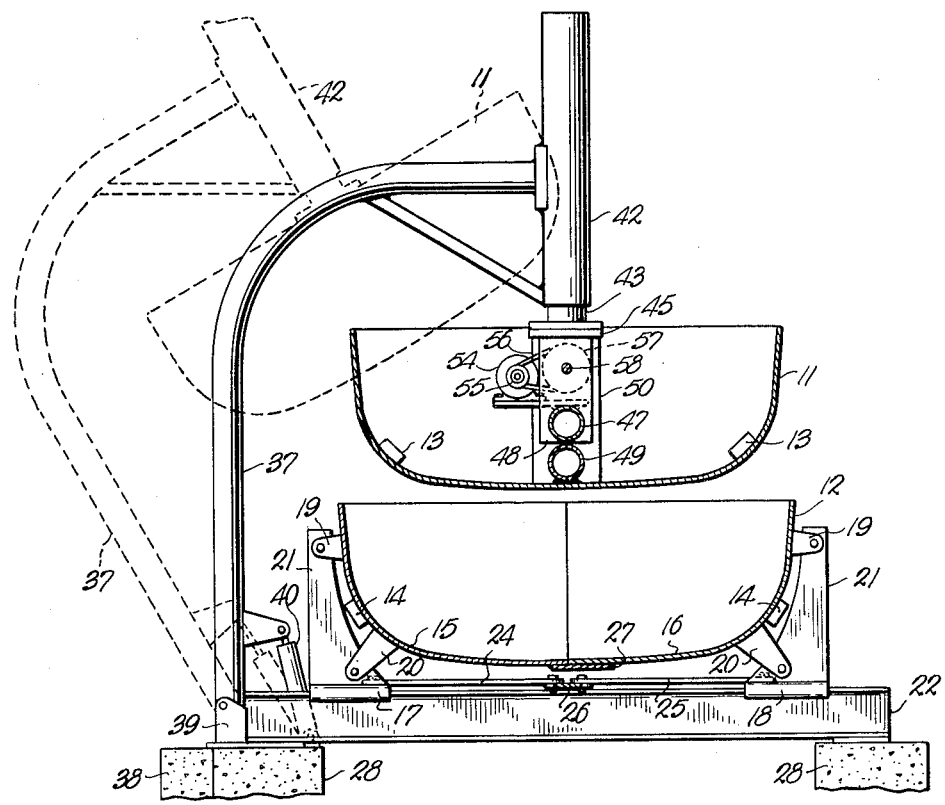
FIGURE 3 is a vertical section taken substantially along the line 3—3 of FIGURE 1, showing the male mold in open position in dotted lines.

A mold assembly designated by reference numeral 10 comprises an upper, male, molding block or mold 11 and a lower, female molding block or mold 12. The molds in the preferred embodiment of my invention are made of brass and are shaped to correspond to the desired shape of the boat hull section. However, the molds may be made of other metal alloys or metals which have the same characteristic of brass in that they tend to fairly rapidly oxidize when exposed to air.

High frequency electric vibrators 13 are mounted on the upper or outer surface of male mold 11, and other similar electric vibrators 14 are mounted on the lower or outer surface of female mold 12.

Mold 12 is formed of two separate halves 15 and 16, each forming one half of the mold and separated along its longitudinal center. Half mold 15 is secured to movable platform 17 and half mold 16 is secured to movable platform 18, by means of upper brackets 19 and lower brackets 20, engaging upright supports 21. Platforms 17 and 18 are slidably mounted on fixed front track 22 and fixed rear track 23 so that there may be sidewise movement of platforms 17 and 18 in a horizontal plane. As best shown in FIGURE 2 this sidewise movement is accomplished by means of two hinged arms 24, hinged to movable platform 17, and two similar arms 25 hinged to movable platform 18. At their opposite ends, arms 24 and 25 are hinged to driving rod 26. As seen in FIGURE 2, in the closed position of mold 12 arms 24 and 25 form a shallow V with relation to each other. If driving arm 26 is moved in a direction from front track 22 to rear track 23, arms 24 and 25 tend to form a flatter V, causing platforms 17 and 18 to move outward from driving rod 26. As driving arm 26 is activated, causing movable platforms 17 and 18 to move away from each other, it is seen that the mold halves will separate or open horizontally, and as the driving rod reverses its direction, the two haves of the female mold will close.

A curved lip 27 is carried by female half mold 15, as seen in FIGURE 7, and extends under half mold 16, conforming to the curve thereof, extending the length of female mold 12 under the center thereof, serving as a closure to avoid the loss of plastic as the mold halves open and close. Fixed tracks 22 and 23 are rigidly mounted on fixed concrete bases 28.

The moving of driving rod 26 is imparted by horizontal eccentric mechanism 29 best shown in detail drawing FIGURE 6. This consists of an electric motor 30, mounted at the front end of rod 26, a camshaft 31 directly driven by motor 30, and two eccentric cams 32 carried by camshaft 31. Cams 32 rotate in cam recesses 33 in saddle 34, which is carried by piston 35, which rides in hydraulic cylinder 36. Hydraulic cylinder 36 and piston 35 may be employed to impart a greater horizontal movement between half mold 15 and half mold 16 so as to maintain the two half molds in an open position for servicing. As best noted in FIGURE 1, the eccentric mechanism 29 is positioned above tracks 22 and 23, but below female half molds 15 and 16.

Male mold 11 is suspended over female mold 12 by means of cantilevered arm 37, which is hinged to base 38 by hinges 39 and may be moved into or out of molding position by means of hydraulic piston mechanism 40. The movement of male mold 12 into and out of molding position is best illustrated in FIGURE 3, in which the open or out of molding position is shown by dotted lines. It will be apparent that in the open position access may be had to the inner surfaces of the molds, for purposes of servicing.

Figures 4, 5:
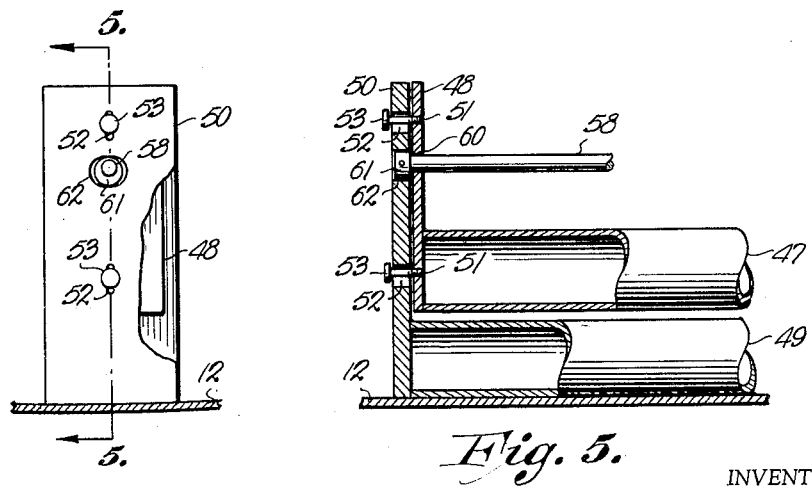
FIGURE 4 is an enlarged detail drawing substantially. along the line 4—4 of FIGURE 1, showing a portion of the mechanism for oscillating the male mold.
FIGURE 5 is a detail drawing partly in cross-section along the line 5—5 of FIGURE 4, further showing the oscillating mechanism.

Male mold 11 is connected to cantilever arm 37 by means of vertical hydraulic cylinder mechanism 41 consisting of a cylinder 42 welded or otherwise rigidly secured to cantilever arm 37 and a piston 43 contained within cylinder 42. By operation of hydraulic mechanism 41, male mold 11 may be lowered into exact molding relation with female mold 12 or may be retracted upward. Piston 43 is connected to male mold 11 by vertical eccentric mechanism shown in FIGURES 1 and 3 and shown in detail in FIGURES 4 and 5.

Vertical eccentric mechanism 44 connects to piston 43 by means of coupling collars 45 which in turn are secured to vertical pipe frame 46, which carries horizontal pipe frame 47. At the two ends of horizontal pipe frame 47, and rigidly secured thereto, are identical vertical guide plates 48. All of the foregoing positions of the eccentric mechanism are rigidly secured to piston 43. Other portions of the eccentric mechanism are rigidly secured to the upper surface of male mold 11, and consist of a second horizontal pipe frame 49 and two identical vertical cam plates 50, one of which is affixed to each end of pipe frame 49, so as to be outward of and in abutting position to guide plates 48.

Guide plates 48 each carry two similar pins 51 which extend through slots 52 in cam plates 50 and are held in place by pin heads 53. Thus it is apparent that there is a slideable connection between guide plates 48 and cam plates 50, cam plates 50 being able to move upward or downward with relation to guide plates 48, a distance equal to the vertical length of slots 52.

Vertical eccentric mechanism 44 may be activated by electric motor 54 mounted on pipe frame 47 through medium of driving pulley 55 which is connected through pulley belt 56 with pulley 57 mounted on camshaft 58. Camshaft 58 is carried by vertical pipe frame 46, through the medium of camshaft bearing 59 and extends horizontally through holes 60 in guide plates 48. When motor 54 is switched on, camshaft 58 is caused to rotate, imparting a similar rotation to cams 61 within cam recesses 62 of vertical cam plates 50. The off-center movement of cams 61 imparts a similar movement through cam recesses 62 to cam plates 50, which being restrained against horizontal movement by pins 51 within slots 52, can only move upward and downward due to the cam action. Thus it is seen that a vertical movement upward and downward, or in and out of female mold 12, is imparted to male mold 11, the length of the movement being limited by the height of slots 52 and the speed of the movement being governed by the speed of revolution of motor 54 as varied by the difference in radii of pulleys 55 and 57.

To form a boat hull structure in accordance with the method disclosed in the present invention, one begins with male mold 11 in the open position shown in dotted lines in FIGURE 3. Thin layers of fibrous material such as glass fiber are cut to the desired size and placed in layers in female mold 12, which is then in its closed position with half molds 15 and 16 abutting each other. Then a suitable adhesive is poured into mold 12. In connection with the use of fiber glass sheets a polyester, pre-mixed with a hardener or catalyst is suitable, but other adhesives may be employed, and the use of any particular adhesive is not deemed an element of this invention.

Male mold 11 is then lowered into the operative position above female mold 12, shown in solid lines in FIGURE 3. At this point the adhesive tends to settle and gather at the center and low point of mold 12 and is prevented from escaping by lip 27. To cause the adhesive to disperse throughout the mold, motor 30 is switched on, actuating cams 61, which impart a forward and backward movement to driving rod 26 which in turn by virtue of its linkage with hinged arms 24 and 25 imparts a sideward movement to movable platforms 17 and 18, thereby imparting a similar movement to the two halves 15 and 16 of female mold 12. This horizontal movement has been found to be most effective when it ranges from 1/64" to 3/4". At the same time vertical eccentric mechanism 44 is actuated thereby imparting an upward-downward movement to male mold 11. This vertical movement is also most effective within the same approximate ranges of movement. The combined effect of the relative movements of molds 11 and 12 tends to cause the adhesive to spread out lengthwise and widthwise of the mold. The movements imparted by the eccentric mechanisms to molds 11 and 12 is a slow or low frequency movement. It will also be noted that a major component of such movement of the molds, with relation to each other is in a plane or direction primarily parallel to the faces of the molds. This tends to spread the adhesive throughout the mold. At the same time there is a component of the movement of the molds which is in a plane perpendicular to the faces of the mold. This portion of the relative movement has a tendency to assist in causing the adhesive to penetrate the several layers of Fiberglas.

Then either in conjunction with the actuation of the eccentric mechanisms, or independently, the vibrators on both molds 11 and 12 are actuated, imparting a high frequency vibratory motion to both molds.

It will be noted that the high frequency vibrators impart a movement to the mold which is primarily in a direction perpendicular to the surfaces of the mold. This motion tends to force the adhesive through the various layers of the fiber glass sheeting, and further assists in the even spreading of the adhesive throughout the body of the boat hull being molded.

The apparatus and method disclosed herein are ideally suited for the formation of boat hulls formed of several layers of Fiberglas sheets which are laminated by means of polyester plastics. However, the apparatus and method are equally adaptable to use of other relatively thin sheets of other fibrous materials and other adhesives.

The high frequency vibrations and low frequency movements imparted to the molds may be varied and yet accomplish the same purposes. For example, an oscillatory or circular movement might be imparted to mold 12 instead of the sidewise movement. Many other possible movements may be employed, it being important, however, to impart movement substantially parallel to the faces of the mold as well as perpendicular thereto.

The problem exists in molding reinforced Fiberglas objects and similar plastic products, particularly of any large size such as boat hulls and similar products, that there is a tendency for the Fiberglas and adhesive to adhere to the surface of the mold. It has been found and is a feature of this invention that if the surfaces of the mold which are in contact with the product are formed of brass, or a similar metal, the object will separate clean from the mold. It is believed that this results from the fact that the brass surface tends to oxidize and the oxide film on the surface of the mold prevents any bonding or sticking between the product and the face of the mold. This oxidation of the surface of the metal will result merely from exposure to the air. However, in practice we have found that brushing the brass surface with an acid, or other oxidizing agent, prior to the use of the mold tends to accelerate the formation of the film thereby improving the stripping of the product from the mold. This advantage is not limited to the use of brass, but may be accomplished by the use of any other metal alloy or metal, such as copper, which will tend to oxidize on exposure to air.

It should also be pointed out that the principles of my invention may be embodied in other mechanisms and are not limited to the particular combinations employed in the embodiment hereinabove described.

Having fully disclosed my invention, I claim:

1. A mold body for molding plastic boat hulls and similar products comprising a male mold, high frequency vibrators mounted on the outer surface of said male mold, a female mold consisting of two half molds, high frequency vibrators mounted on the outer surface of said female mold, hinged arm mechanism adapted to cause said half molds to open and close, mechanism adapted to bring said female mold and said male mold into molding relation and further mechanism for imparting a slight oscillatory movement of said male mold toward and then away from said female mold, in a plane of movement perpendicular to the plane of the movement imparted by said hinged arm mechanism to said half molds.

2. A mold body comprising a male mold, a female mold consisting of two half molds, mechanism for sliding said half molds into and out of abutting relation, mechanism adapted to bring said male mold into molding relation with said female mold, further mechanism for imparting a slight oscillatory movement of said male mold toward and away from said female mold, simultaneously with the movement of, and in a plane of movement of, said half molds; and vibrators attached to each of said molds.

References Cited by the Examiner

UNITED STATES PATENTS

| | | | |
|---|---|---|---|
| 631,328 | 8/1899 | Rowe | 18—47 |
| 1,570,802 | 1/1926 | Von Bichowsky | 18—47 |
| 2,349,920 | 5/1944 | Welcome | 18—47 |
| 2,736,942 | 3/1956 | Dudley | 25—121 |
| 2,781,570 | 2/1957 | Seymour | 25—121 X |
| 2,845,379 | 7/1958 | Bey | 156—122 |
| 2,850,423 | 9/1958 | Kramp et al. | 156—122 |
| 2,851,725 | 9/1958 | Bauer | 18—5 |
| 2,909,826 | 10/1959 | McElroy | 25—41 |
| 3,015,843 | 1/1962 | Gora | 18—5 |
| 3,030,687 | 4/1962 | Muspratt | 25—41 |
| 3,122,787 | 3/1964 | Adams | 18—5 |
| 3,123,857 | 3/1964 | Wacker | 264—71 |

J. SPENCER OVERHOLSER, *Primary Examiner.*

WILLIAM J. STEPHENSON, MICHAEL V. BRINDISI,
*Examiners.*